United States Patent
Kessler et al.

(10) Patent No.: US 9,807,075 B2
(45) Date of Patent: Oct. 31, 2017

(54) METHODS FOR ACTIVATION OF AN APPLICATION ON A USER DEVICE

(71) Applicant: Good Technology Holdings Limited, Waterloo (CA)

(72) Inventors: Saul Kessler, Sunnyvale, CA (US); Sean Michael Quinlan, Duvall, WA (US); Haniff Somani, Mercer Island, WA (US); Nigel Thompson, Denver, CO (US); Adrian Satmarel, Cluj Napoca (RO)

(73) Assignee: Good Technology Holdings Limited, Waterloo, Ontario (CA)

( * ) Notice: Subject to any disclaimer, the term of this patent is extended or adjusted under 35 U.S.C. 154(b) by 0 days.

(21) Appl. No.: 14/812,756

(22) Filed: Jul. 29, 2015

(65) Prior Publication Data
US 2015/0334105 A1    Nov. 19, 2015

Related U.S. Application Data

(63) Continuation of application No. PCT/US2014/013457, filed on Jan. 28, 2014.
(Continued)

(51) Int. Cl.
*H04L 29/06* (2006.01)
*H04L 29/08* (2006.01)
(Continued)

(52) U.S. Cl.
CPC ............ *H04L 63/08* (2013.01); *G06F 21/105* (2013.01); *G06F 21/121* (2013.01); *G06F 21/41* (2013.01); *H04L 67/025* (2013.01); *H04L 67/10* (2013.01); *G06F 2221/0742* (2013.01); *G06F 2221/2115* (2013.01); *G06Q 20/32* (2013.01); *H04M 15/43* (2013.01)

(58) Field of Classification Search
CPC combination set(s) only.
See application file for complete search history.

(56) References Cited

U.S. PATENT DOCUMENTS 5,103,476 A     4/1992  Waite et al.
2003/0159072 A1  8/2003  Bellinger
(Continued)

OTHER PUBLICATIONS

International Search Report and Written Opinion dated Jun. 13, 2014 issued on related PCT Application No. PCT/US2014/013457, filed Jan. 28, 2014 and published by the International Bureau as WO/2014/120691 on Aug. 7, 2014.
(Continued)

*Primary Examiner* — Jeffrey Pwu
*Assistant Examiner* — Samuel Ambaye
(74) *Attorney, Agent, or Firm* — Fish & Richardson P.C.

(57) ABSTRACT

Methods for activating a second application on a user device using a first application already installed and activated on the user device are described. In one embodiment the second application requests activation from the first application. The first application then authenticates a user before providing an activation response. The activation response can be requested from a remote server by the first application on behalf of the second application. The methods improve the ease of activating new software on a user device.

20 Claims, 3 Drawing Sheets

Related U.S. Application Data (60) Provisional application No. 61/758,010, filed on Jan. 29, 2013.

(51) Int. Cl.
  *G06F 21/10* (2013.01)
  *G06F 21/12* (2013.01)
  *G06F 21/41* (2013.01)
  G06Q 20/32 (2012.01)
  H04M 15/00 (2006.01)

(56) References Cited

U.S. PATENT DOCUMENTS

| | | |
|---|---|---|
| 2007/0239985 A1 | 10/2007 | Bernabeu-Auban et al. |
| 2009/0106110 A1† | 4/2009 | Stannard et al. |
| 2009/0204544 A1† | 8/2009 | Eizenhoefer et al. |
| 2009/0260002 A1 | 10/2009 | Volovic et al. |
| 2012/0284786 A1* | 11/2012 | Somani ............... H04L 63/0815 726/7 |
| 2012/0304200 A1* | 11/2012 | Oliver .................. G06F 9/4843 719/319 |
| 2015/0193267 A1* | 7/2015 | Shafer .................... G06F 9/468 719/320 |

OTHER PUBLICATIONS

Extended European Search Report issued in European Application No. 14746695.7 dated Sep. 2, 2016.

\* cited by examiner
† cited by third party

METHODS FOR ACTIVATION OF AN APPLICATION ON A USER DEVICE

CROSS-REFERENCE TO RELATED APPLICATIONS

This application is a continuation under 35 U.S.C. §120 of International Application No. PCT/US2014/013457, filed Jan. 28, 2014 (published by the International Bureau as International Publication No. WO/2014/120691 on Aug. 7, 2014), which claims the benefit of U.S. Provisional Patent Application No. 61/758,010, filed Jan. 29, 2013. The entire contents of each of the above-referenced patent applications are hereby incorporated by reference.

BACKGROUND OF THE INVENTION

Field of the Invention

The present invention relates to methods and apparatuses for activating an application on a user device with a remote device.

Description of the Related Technology

Applications installed on user devices may require activation to enable their access to data, allow remote configuration and management of the application, or to enforce license requirements. For example, an application may have limited or no functionality until activation has been completed.

One method of activating an application on a user device requires a user to copy an activation number from an email into an application. The activation number is then communicated to a remote server to activate the application with the remote server. In the case where several applications require activation with the remote server, a separate email is required for each one, making the process time consuming and complex for the user.

So called Single Sign On (SSO) systems have been proposed. These systems allow a user to login to a resource using a separate identity provider. The identity provider is trusted by the resource to verify the user's credentials to access the resource. Several different resources can use the same identity provider, avoiding the need for a separate username and password for each resource. Examples of SSO systems are discussed in U.S. Patent Publication No. 2012/0072979.

SUMMARY

According to a first exemplary embodiment, there is provided a method of activating a second application on a user device using a first application on the user device and a remote device. The first application has already been activated with the remote device. The method comprises: responsive to a request by the second application for an activation response, providing, by the first application, an activation response comprising activation data to the second application, the activation response having been generated on the basis of data associated with the remote device; and requesting, by the second application, activation of the second application by the remote device using the activation data.

According to another exemplary embodiment, there is provided a method of activating a second application on a user device with a remote device. The method comprises, responsive to receipt by the remote device of an activation request for the second application from a first application on the user device, wherein the first application has already been activated with the remote device: transmitting, by the remote device, an activation response comprising activation data for the second application to the first application on the user device.

According to a further exemplary embodiment, there is provided a method of providing details of one or more applications on a user device that can be used to activate other applications on the user device with a remote device. The method comprises, responsive to receipt by the remote device of a request for details of applications on a user device that can be used to activate other applications on the software device: identifying, by the remote device, applications on the user device which have been activated with the remote server and which can provide activation services with the remote server for other applications; and transmitting, by the remote device, details of the identified applications to the user device.

According to a still further exemplary embodiment, there is provided an apparatus comprising at least one processor and non-transitory storage including computer program instructions. The non-transitory storage and the computer program instructions are configured to, with the at least one processor, cause the apparatus at least to activate a second application on the apparatus using a first application on the apparatus and a remote device, wherein the first application has already been activated with the remote device, by a method comprising: responsive to a request by the second application for an activation response, providing, by the first application, an activation response comprising activation data to the second application, the activation response having been generated on the basis of data associated with the remote device; and requesting, by the second application, activation of the second application by the remote device using the activation data.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Embodiments provide methods and apparatus which improve the ease of activating an application on a user device with a remote device. In one embodiment, a first application on a user device provides an activation response to a second application on a user device in response to a request for an activation response by the second application. The activation response contains activation data which is then used by the second application to activate with a remote device. This allows the activation data to be obtained via a first application, rather than from another source such as an email sent to a user.

The method can further comprise requesting, by the first application, the activation response from the remote device;

and receiving, by the first application, the activation response from the remote device for provision to the second application. In this embodiment, the first application acts as a proxy for the second application to request the activation data from the remote device. The remote device can trust the first application to provide the activation data to it because the first application has already been activated with the remote device. Application activation is simplified for the user because no additional source of activation information, such as an email, is required.

The first application may also obtain application data of the second application and then provide the application data in the request for the activation response from the remote device. This can provide further security, for example it allows the remote device to check the application data before providing an activation response. The application data can be obtained in any suitable way, for example it could be taken from meta-data included in a request from the second application to the first application, and relate to any information about the application, such as an identifier or name.

The method can further comprise selecting, by the second application, the first application from a group of one or more other applications on the user device which can provide an activation response. It is possible that more than one application on the user device can provide an activation response. In that case the second application can select a particular application from which to request the activation response. In one embodiment, details of the group of one or more other applications on the user device which can provide an activation response are requested from the remote device. In another embodiment, details of the group of one or more other applications on the user device that can provide an activation response are requested from a second remote device different from the remote device with which activation is requested.

The first application can authenticate a user's credentials for the first application. The activation response is then only provided responsive to successful authentication of the user's credentials by the first application. This improves the security of the activation system by authenticating or re-authenticating the user's credentials before providing the activation response.

The user can use existing credentials for the first application. This has a further advantage that the user knows the credentials already and does not have to remember or copy a code from elsewhere, such as an email. In some embodiments the first application always prompts the user for credentials which are authenticated before providing an activation response to the second application. In other embodiments, the first application may already be in use on the user device and have previously requested user authentication for activation of another application or another purpose, and in that case, the earlier authentication may be used if an activation request is received from another application without prompting for further entry of credentials. This is less secure than always prompting the user for credentials, but may be more convenient. For example, earlier authentication of the first application may be used if the user provided authentication to the first application within a predetermined time of the activation request, for example within 5, 10 or 15 minutes. Authenticating can comprise requesting entry of a user's credentials for the first application on the user device. Any suitable credentials can be requested, including username and password, a biometric ID, such as a finger print, and a predefined gesture on a touch screen.

The method can further comprise: requesting, by the first application, a display name for the second application from a remote device; receiving, by the first application, the display name for the second application; and requesting user confirmation that that the application with the display name should be activated. The activation response is sent responsive to suitable confirmation from the user and is not sent otherwise. This improves the security of the method because the identity of the second application is independently verified by a remote device, potentially enabling malicious applications to be identified. The remote device can be the same device used for activation or a separate remote device. The display name can be determined by the remote device in any suitable way. For example, the second application may have a unique identifier which is passed to the remote device and used to look up a stored display name corresponding to the unique identifier.

The first application can have a primary function different from providing activation responses. For example, the first application may provide activation responses as an additional feature to its main function.

The activation of the second application may not be repeated at least the next time the second application is started on the user device. In some embodiments activation of the second application is only carried out once. For example, activation can be a one-time process to enable use of the application on the user device.

The request by the second application for an activation response can include an associated code. The associated code can then be used in the requesting activation by the second application, together with the activation data. The associated code can be a nonce or other single or limited-use code and can be in any machine-readable format. For example, the associated code can be a randomly generated number.

In another embodiment, a remote device transmits an activation response comprising activation data for a second application to a first application on the user device, in response to a request from the first application. The first application has already been activated with the remote device so the first application can be trusted by the remote device.

In another embodiment, responsive to receipt by a remote device of a request for details of applications on a user device that can be used to activate other applications on the software device, the remote device: identifies applications on the user device which have been activated with the remote device and that can provide activation services with the remote device for other applications; and transmits details of the identified applications to the user device. This allows an application on a user device to request details of other applications on the user device that can be used for activation.

Figure 1:
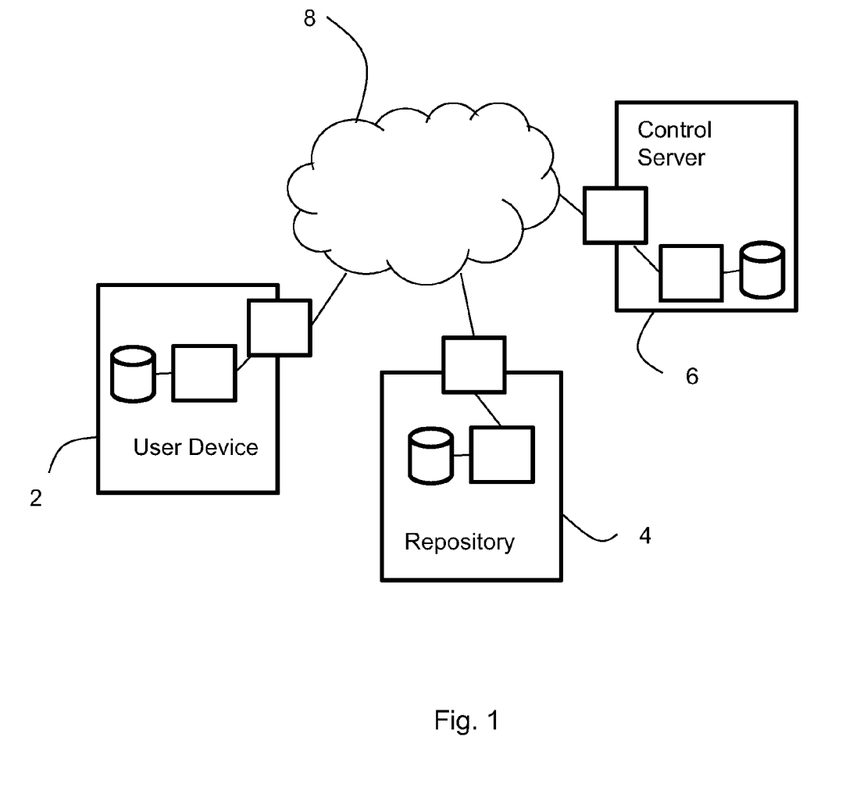
FIG. 1 is a diagrammatic representation of a system in which embodiments may be used.

An example of a system in which embodiments may function is illustrated in FIG. 1. The system comprises a user device 2, repository 4, and control server 6. Each of the user device 2, repository 4 and control server 6 contains at least one processor, non-transitory storage, and a network interface. A network 8 connects all of the user device 2, repository 4, and control server 6.

Although a single network 8 is depicted for the purposes of clarity, the invention is not limited to a single network 8. Other embodiments may comprise separate interconnected networks and additional network elements, including but not limited to firewalls (for example between the control server 6 and the network 8) and gateways at transition points from one network to another. For example, the network 8 may be a wireless network, such as one conforming to standards set by 3GPP, including but not limited to Universal Mobile Telecommunication System (UMTS), Long Term Evolution (LTE), and Long Term Evolution-Advanced. The network 8 can also conform to other wireless network standards, such as IEEE 802.11 Wi-Fi standard and IEEE802.16 WiMAX standards. A mixture of wired and wireless networks can also be used. For example, a wired network can be provided between the repository 4 and the control server 6 in some embodiments.

The user device 2 can be any device capable of storing and running applications. For example, the user device 2 can be a mobile device, such as a mobile or phone (including so-called "smart phones"), tablet computer, Personal Digital Assistant, pager, laptop computer, content consumption and/or generation devices or any other portable device including a processor that can be configured to run user installed applications. The processor of the user device 2 is configured to run applications stored in the non-transitory storage, which can then access data over the network 8. In some embodiments, at least one of the applications stored in the non-transitory storage requires activation with the repository 4 for at least some of its functions, has been activated with the repository 4, and is available to receive activation requests with the repository 4 on behalf of other applications on the user device.

The repository 4 is responsible for at least partially activating and optionally configuring at least one application on the user device 2. It has a processor configured to communicate with applications on the user device and provide activation and/or configuration of the applications.

Control server 6 provides a means for an enterprise to control the configuration and activation of applications on the user device 2. It has a processor configured to allow an administrator to configure and activate applications remotely on the user device 2. Configuration and activation can be through direct or indirect communication with the user device 2. For example, the activation may be through direct communication with the user device 2, or through indirect communication via the repository 4.

The user device 2 may be configured to run two or more applications. To ensure that the two or more applications are configured securely and in accordance with permissions of a particular user, the applications require activation with the repository 4 and/or the control server 6, which are remote from the user device, before they can be used. A network administrator can interact with the control server 6 to alter application permissions and configurations for user devices and/or users.

Figure 2:
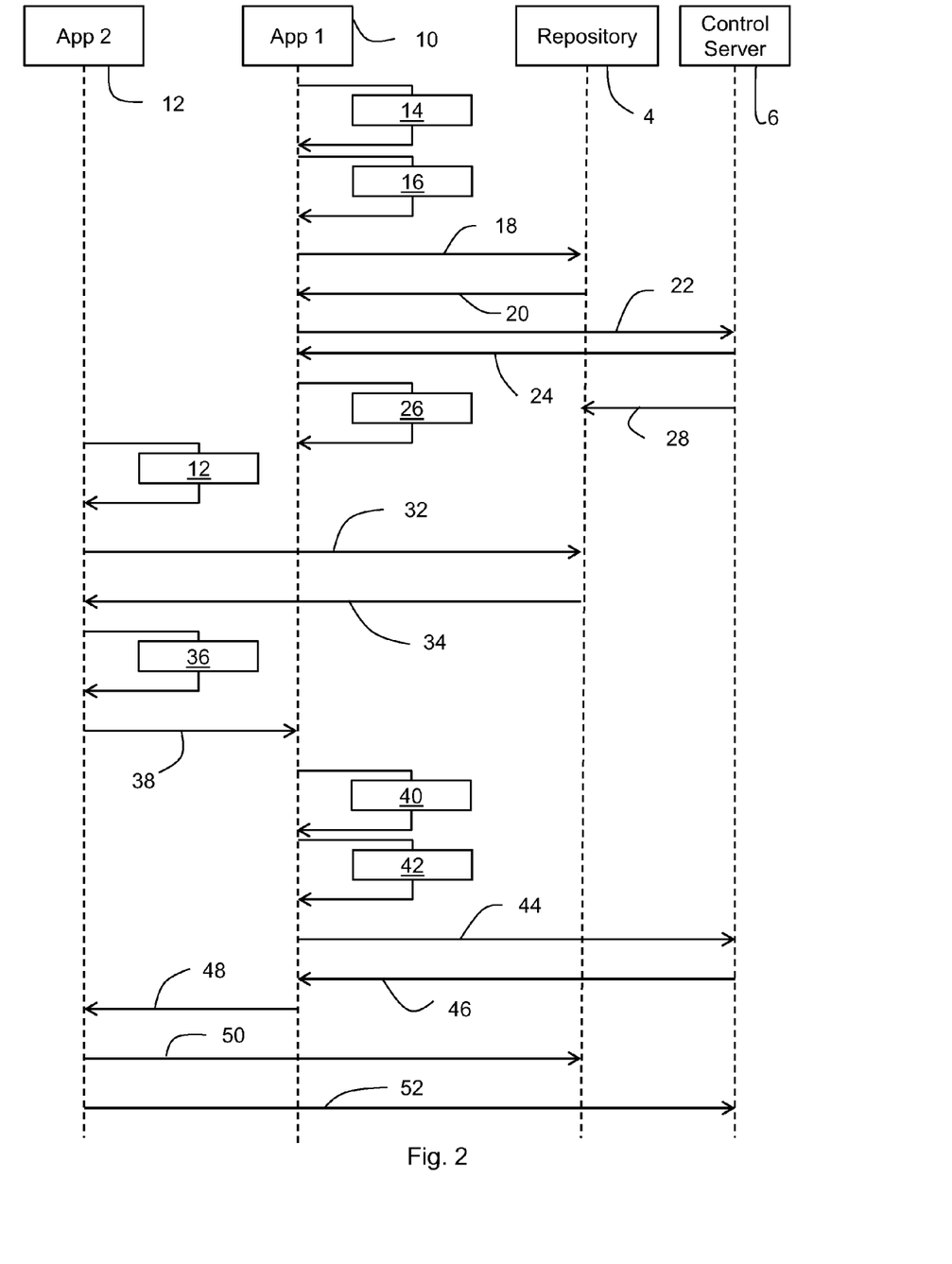
FIG. 2 is a diagrammatic representation of signal flows for activation of a first application and a second application in an embodiment.

FIG. 2 depicts the signal flows in a process of activating a first application 10 and a second application 12 on a user device according to an embodiment. In this embodiment the second application 12 can use the first application 10 for at least part of the activation process, simplifying the activation process for a user.

First, at step 14, the user of the user device installs and launches the first application 10 for the first time. For example, the user may download an installation file or package from a remote application store (not shown). When the first application 10 runs for the first time, the first application 10 prompts the user for an email address and activation code at step 16. The user will have been notified of the activation code by an email sent to the email address. For example, when an administrator adds an authorized user of the first application 10 using the control server 6, an alphanumeric access key, which functions as an activation code, is created for the user and sent to the user in an email. The user enters the activation code in response to the prompt in step 16.

The first application 10 then uses the activation code to activate with both the repository 4 and the control server 6. The same code may be used to activate with both the repository 4 and the control server 6. Alternatively, for increased security, a hash of the activation code may be used with the repository 4 and the original activation code with the control server 6. In that case, the repository 4 has previously been notified of the hash of the access code by the control server 6 at the same time that the control server sent the activation email to the user.

At step 18, the first application 10 sends activation data, for example the hash of the activation code entered by the user, to the repository 4. The repository 4 checks these for validity and responds at step 20 with provisioning data. For example, this can include keys and server data to enable the first application 10 to communicate with the control server 6.

Next, at step 22, the first application sends activation data, for example the activation code entered by the user, to the control server 6. The control server 6 checks the application for validity and responds at step 24 with data required for the application to be used, such as configuration data and server data for the application. In some embodiments, further activation steps can be included in which data is exchanged between the first application 10 and the control server 6. For example additional steps may involve the exchange of random data to further secure the connection.

The first application 10 then prompts the user to set a password or other form of credential, such as registering a biometric ID, at step 26. This password or other form of credential is then used to authenticate the user to the first application, and the same can also be used to secure encryption keys and other data.

The first application provides a primary application service to a user, for example an email or document access service. In addition, the first application 10 can provide activation services for other applications on the user device 2. These activation services can be completely transparent to the user. Provision of activation services can be added to the first application 10 during development, for example they can form a part of a standard framework used to develop the first application 10. At step 28, the control server 6 registers the first application 10 with the repository 4 as an application on the user device 2 that can offer activation services with the control server 6 for other applications.

As described so far, the first application 10 has been activated with the repository 4 and the control server 6 using an activation code provided by some other means, such as an email. The first application 10 can be used on the user device 2 without further need for activation using the password or other credential set up in step 26. The activation of the second application 12 with the repository 4 and control server 6 will now be described. This makes use of the activation services provided by the first application 10 so that the user does not need to enter an activation code received by other means.

At step 30, the user installs and runs the second application 12 on the user device. For example, an installation file may have been previously downloaded to the user device. The second application 12 has been developed to allow activation using another application on the user device that provides activation services. When the second application 12 runs without being activated, it seeks details of other applications on the user device that provide activation services. At step 32, the second application 12 sends a request to the repository 4 for details of the applications on the user device that provide activation services. For example, a device ID may be sent. At this stage, because the second application 12 is not yet activated with the repository 4, the request is anonymous. The repository 4 responds at step 34.

In this example, the details sent in step 34 include only the first application 10 because it is the only application installed to provide activation services. However, if the user device contains more than one application that provides application services, details of more than one application can be returned in step 34. When more than one application already installed on the user device can provide activation services, one of those applications can be designated as the one to provide services to other applications. This avoids confusion for the user because each application already installed on the device may require different credentials. Selecting one application to provide the activation services means the credentials requested are consistent for each additional application activated.

At step 36, the second application 12 tests for the presence of the first application 10 on the user device to ensure that it is installed and available for use. If this test fails, the second application 12 does not try to use the first application 10 for activation. In that case, other applications that were notified as providing application services in step 34 can be tested, or the second application can be activated using a code notified by other means, such as the email activation code used to activate the first application 10 and described above.

Assuming that the test for the presence of the first application 10 at step 36 is successful, the second application 12 sends an activation request to the first application 10 at step 38. For example, this request can use Inter-Process Communication (IPC). The activation request can contain details of the second application 12 that the first application 10 can use to identify the second application, such as a unique identifier, digital signature information to verify the source of the application, an application name and so on. Information about the second application 12 may also be gathered by the first application 10 from metadata that is provided by the operating system with the activation request. In some embodiments, the first application 10 can check the details of the second application 12 with a remote data source. For example, the first application 10 can retrieve the name of the second application 12 from the repository 4 or the control server 6 using a unique identifier.

Depending on an underlying operating system of the user device, IPC can be accomplished in different ways. In one example, if the user device is running the iOS operating system, the second application 12 may make an initial "openURL" call using a URL with a custom scheme that the first application 10 is registered to handle. Information regarding the custom scheme specific to the first application 10 may have been provided to the second application 12 as a part of the details of the group of one or more other applications on the user device that can provide an activation response. In this case, the openURL call conveys a "bundle ID", provided by the operating system, of the second application 12. The "bundle ID" can be used as the unique identifier of the second application 12. Similarly, the first application 10 may return information to the second application 12 by making an openURL call using a URL with a custom scheme that the second application 12 is registered to handle. Information regarding the custom scheme specific to the second application 12 may have been provided to the first application 10 as a part of the URL of initial openURL call made by the second application 12. A sequence of such openURL calls can be used to exchange information, embedded in the URL, between the two applications. In addition, the openURL calls can be used to exchange TCP port information, which allows the two applications to establish a local TCP communication channel between the first application 10 and the second application 12 over which further information could be exchanged.

In another example, if the user device is running the Android operating system, the second application 12 may send an "Intent" to the first application 10. Information, such as class name, package name, action, URI, etc., necessary to address an Intent specifically to the first application 10 may have been provided to the second application 12 as a part of the details of the group of one or more other applications on the user device which can provide an activation response. In this case, the Intent conveys the "package name" provided by the operating system, of the second application 12. The package name can be used as the unique identifier of the second application 12. Similarly, the first application 10 may return information to the second application 12 by sending an Intent to the second application 12. Information necessary to address an Intent specifically to the second application 12 may have been provided to the first application 10 as a part of the initial Intent sent by the second application 12. A sequence of such Intents can be used to exchange information between the two applications. In addition, the Intents can be used to exchange TCP port information, which allows the two applications to establish a local TCP communication channel between the first application 10 and the second application 12 over which further information could be exchanged. Other examples can use other mechanisms appropriate to the particular operating system of the user device.

On receipt of the activation request, the first application 10 prompts for user credentials at step 40. For example the password set up in step 26 described above may be requested. If this is successful, execution proceeds to step 42, otherwise the first application 10 stops processing the activation request.

Next, at step 42, the first application 10 prompts the user to confirm that installation of the second application 12 is required. This can guard against applications installing on the user device without the knowledge of the user. If the first application 10 has retrieved an application name from a remote data source, the application name can be displayed along with the request for confirmation as a further check on the identity of the application being installed. If confirmation is received, the first application 10 proceeds to step 44. If no confirmation is received, or after expiry of a predetermined time without a user response, the first application 10 stops processing the activation request.

At this stage in the process, the first application 10 has authenticated the user by the request for credentials in step 40, and the user has confirmed that the installation of the second application 12 is required in step 42. In some embodiments, these steps can be combined, for example by requesting user credentials to confirm the installation of the second application 12, so that successful entry of user credentials is interpreted as being confirmation to install the second application 12.

The first application 10 now makes a request to the control server 6 for activation data that the second application 12 can use for activation at step 44. On receipt of a request for activation data, the control server 6 trusts the authentication of the user by the first application 10 and checks that the user or user device is authorized to use the second application 12 before generating an activation code or retrieving a previously generated activation code, which is sent to first application 10 at step 46. In some embodiments, there may be an additional check by the control server 6 that the second application 12 is registered in the repository 4 before the activation code is sent. For example, this additional check can use application data about the second application 12 that was gathered by the first application 10. Security is then improved by preventing applications not in the repository 4 from being provided activation codes.

The communication between the first application 10 and the control server 6 is encrypted, for example using the SSL protocol, to ensure security of the activation code. The activation code can be an alphanumeric code as described above for the first application 10. In other embodiments, the activation code can have other forms. For example, because the activation code need not be displayed to or entered by the user, the activation code can have any machine readable format. Thus, the activation code can also be sent as bit stream, such as a binary number.

At step 48, the first application 10 forwards the activation code to the second application 12 in an activation response. The activation response has therefore been generated on the basis of data associated with the control server 6. Other activation data can be included in the activation response for use in the activation, such as a user identifier or email address. The second application 12 then activates with the repository 4 in step 50 and the control server 6 in step 52. Further steps are not depicted in FIG. 2 because the activation of the second application 12 can follow the same process as described above for steps 18 to 24. Once activated, the second application 12 can also prompt the user to set a password or other credential, similar to step 26 described above.

In this embodiment, the second application 12 can use the first application 10 to obtain activation data. Rather than the user entering activation data from an external source, such as an email, the user enters credentials previously set up for the first application 10. This provides improved convenience to the user. In some embodiments the control server 6 may continue to send emails with activation codes to users after the installation of the first application 10. In others, the control server 6 can only send an email with an activation code email for the first application 10 because subsequent applications can be activated using the activation services of the first application 10. This can be beneficial when the user is installing several applications to avoid the confusion of receiving several similar emails with activation codes.

Figure 3:
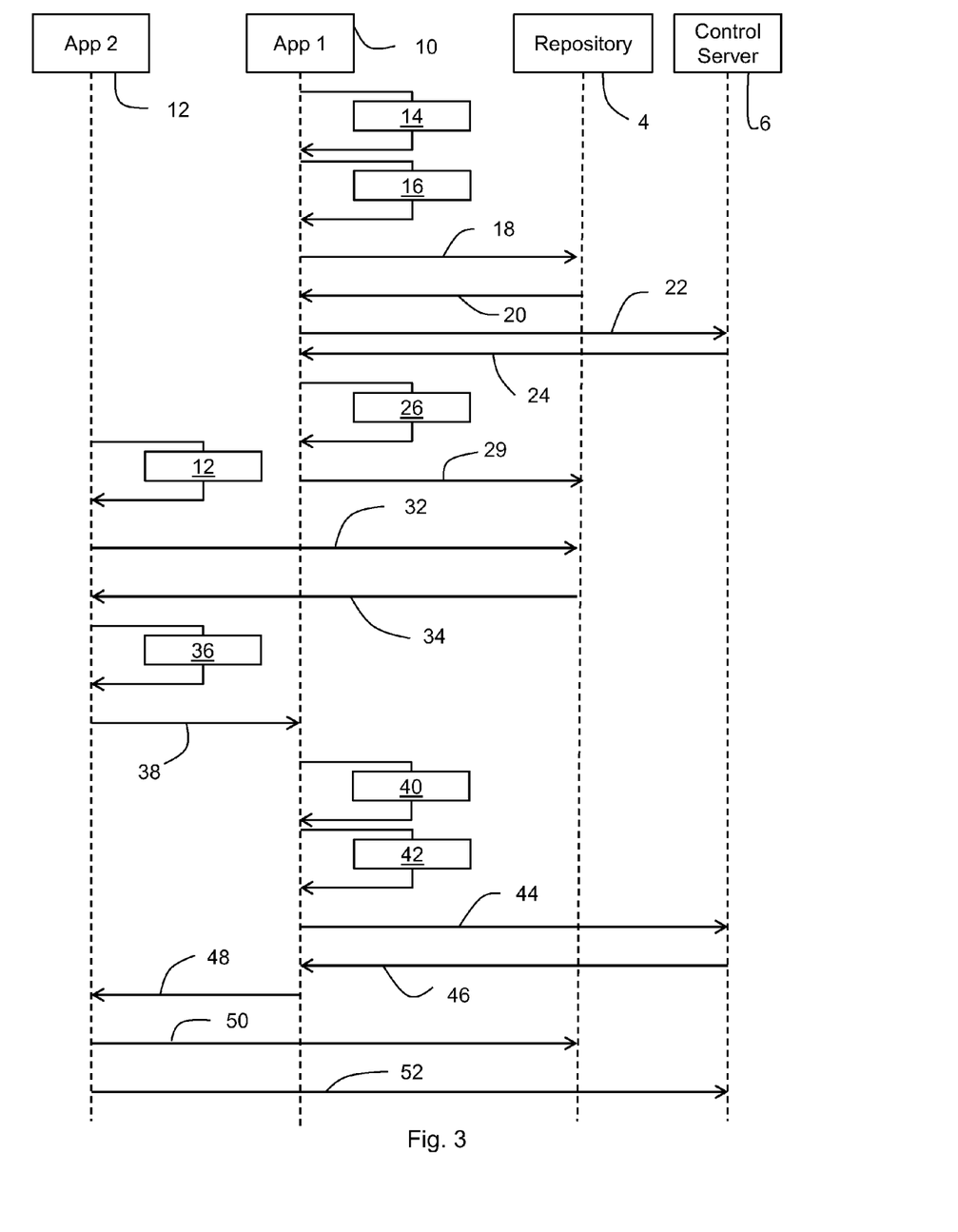
FIG. 3 is a diagrammatic representation of signal flows for activation of a first application and a second application in another embodiment.

FIG. 3 depicts the signal flows in a process of activating a first application 10 and a second application 12 on a user device according to another embodiment. The signal flows in FIG. 3 are the same as in FIG. 2 except that the first application 10 registers itself with the repository 4, at step 29, as an application on the user device that can offer activation services with the control server 6 for other applications. This replaces step 28 of FIG. 2. It can be beneficial for the first application 10 to register itself in this way to reduce status reporting to the control server 6 regarding the availability of the first application 10 to provide activation services for other applications.

Some embodiments may include a nonce, or a single or limited-use code, in the activation request sent at step 38. For example, the nonce may be a random number generated by the second application 12 and retained in memory by the second application 12 for later use. The nonce is transmitted with the activation request to the first application 10 at step 38. The first application 10 then forwards the nonce to the control server 6 at step 44. An activation code is supplied to the first application 10 by the control server 6 as discussed above with reference to step 46. The control server 6 stores the nonce in memory for later use and associates it with the supplied activation code but the nonce is not transmitted with the activation code. At step 52, the second application 12 retrieves the nonce from its memory and includes it with the request for activation sent to the control server 6. On receipt of the request, the control server 6 verifies that the nonce sent with the activation request matches the nonce stored in its memory that is associated with the activation code. Only if the nonce is verified is the second application 12 activated with the control server 6. Use of a nonce restricts the activation codes provided by the control server 6 to the context of a delegated activation request and improves security because the activation codes cannot be used without the associated nonce, which is not transmitted with the activation code.

In an another embodiment, the second application 12 may determine other applications which are resident on the user device that provide activation services by a local request by, for example, raising an event to which activation service providing applications can respond. In these embodiments, steps 32 and 34 described above can be omitted.

In some embodiments, the user device may have applications installed that are associated with different user accounts on the control server 6. In that case, the details of each application that can provide activation services sent to the second application 12 can include a user account identifier. This user account identifier can be used to determine which applications provide activation services for a given user account thereby enabling one for the correct user account to be selected. If more than one application can provide activation services for a particular user account, a single one of those can be selected by an algorithm. Such algorithms may choose a single application to provide the activation delegation services in any suitable way. Examples include selecting the single application to provide the activation delegation services based at least in part on one or more of: an application vendor, an application author and/or an application identifier.

In another embodiment, there may be more than one control server 6 and/or repository 4. This could happen, for example, if a single user device is used with more than one enterprise. In that case, a request for details of applications which provide activation services on the user device can be specific to a particular control server 6.

In a further embodiment, the user can be presented an option of whether to activate the second application 12 using the activation services of another application on the user device, or activating using a code notified by other means, such as email.

In a yet further embodiment, the first application 10 may have established some pre-shared secret with the control server 6 that allows it to generate activation data without contacting the control server 6. In this embodiment, steps 44 and 46 described above and relating to the request and receipt of activation data from control server 6 can be omitted. The activation response is still generated on the basis of data associated with the control server 6 because of the pre-shared secret.

In another embodiment, applications can be activated only with the repository 4 or only with the control server 6. In embodiments where applications are activated only with the control server 6, the repository could be omitted. In further embodiments, the functions of the repository 4 and the control server 6 can be combined into a single device.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of activating a second application on a user device using a first application on the user device and a remote device, wherein the first application has already been activated with the remote device, the method comprising:
    receiving, at the first application executing on the user device and from the second application executing on the user device, a request requesting for an activation response, wherein the first application is different than the second application;
    requesting, by the first application, the activation response from the remote device;
    receiving, by the first application, the activation response from the remote device for provision to the second application;
    in response to receiving the activation response from the remote device, providing, by the first application and to the second application, the activation response comprising activation data, the activation response having been generated on a basis of data associated with the remote device; and
    in response to the first application providing the activation data, requesting, by the second application executing on the user device and to the remote device, activation of the second application, wherein the activation of the second application includes the remote device activating the second application using the activation data, and the remote device is different than the user device.

2. The method of claim 1, further comprising:
    selecting, by the second application, the first application from a group of one or more other applications on the user device which can provide an activation response.

3. The method of claim 2, wherein details of the group one or more other applications on the user device which can provide an activation response are requested from the remote device.

4. The method of claim 2, wherein details of the group of one or more other applications on the user device which can provide an activation response are requested from a second remote device different from the remote device with which activation is requested.

5. The method of claim 1, further comprising:
    authenticating, by the first application, a user's credentials for the first application;
    wherein the activation response is provided responsive to successful authentication of the user's credentials by the first application and not provided otherwise.

6. The method of claim 5, wherein the authenticating comprises requesting entry of a user's credentials for the first application on the user device.

7. The method of claim 1, further comprising:
    requesting, by the first application, a name for the second application from the remote device or another remote device;
    receiving, by the first application, the name for the second application; and
    requesting, by the first application, user confirmation that that the application with the received name should be activated;
    wherein the activation response is sent responsive to confirmation from a user and not sent otherwise.

8. The method of claim 1, wherein the first application has a primary function different from providing activation responses.

9. The method of claim 1, wherein the activation of the second application is not repeated at least a next time the second application is started on the user device.

10. A method of activating a second application for execution on a user device with a remote device, the method comprising:
    receiving, at the remote device and from a first application executing on the user device, an activation request for the second application on the user device, wherein the first application has already been activated with the remote device, the first application is different than the second application, and the remote device is different than the user device; and
    in response to receiving the activation request, transmitting, by the remote device and to the first application on the user device, an activation response comprising activation data for provision to the second application and for the second application to be executed on the user device.

11. An apparatus comprising:
a memory; and
at least one hardware processor communicatively coupled with the memory and configured to cause the apparatus at least to activate a second application on the apparatus using a first application on the apparatus and a remote device, wherein the first application has already been activated with the remote device, by a method comprising:
receiving, at the first application executing on the apparatus and from the second application executing on the apparatus, a request requesting for an activation response, wherein the first application is different than the second application;
requesting, by the first application, the activation response from the remote device;
receiving, by the first application, the activation response from the remote device for provision to the second application;
in response to receiving the activation response from the remote device, providing, by the first application and to the second application, the activation response comprising activation data, the activation response having been generated on a basis of data associated with the remote device; and
in response to the first application providing the activation data, requesting, by the second application executing on the apparatus and to the remote device, activation of the second application, wherein the activation of the second application includes the remote device activating the second application using the activation data, and the remote device is different than the apparatus.

12. The apparatus of claim 11, wherein the method further comprising:
selecting, by the second application, the first application from a group of one or more other applications on the apparatus which can provide an activation response.

13. The apparatus of claim 12, wherein details of the group one or more other applications on the apparatus which can provide an activation response are requested from the remote device.

14. The apparatus of claim 12, wherein details of the group of one or more other applications on the apparatus which can provide an activation response are requested from a second remote device different from the remote device with which activation is requested.

15. The apparatus of claim 11, wherein the method further comprising:
authenticating, by the first application, a user's credentials for the first application;
wherein the activation response is provided responsive to successful authentication of the user's credentials by the first application and not provided otherwise.

16. The apparatus of claim 15, wherein the authenticating comprises requesting entry of a user's credentials for the first application on the apparatus.

17. The apparatus of claim 11, wherein the method further comprising:
requesting, by the first application, a name for the second application from the remote device or another remote device;
receiving, by the first application, the name for the second application; and
requesting, by the first application, user confirmation that that the application with the received name should be activated;
wherein the activation response is sent responsive to confirmation from a user and not sent otherwise.

18. The apparatus of claim 11, wherein the first application has a primary function different from providing activation responses.

19. The apparatus of claim 11, wherein the activation of the second application is not repeated at least a next time the second application is started on the apparatus.

20. A non-transitory computer-readable medium containing instructions which, when executed, cause an apparatus at least to activate a second application on the apparatus using a first application on the apparatus and a remote device, wherein the first application has already been activated with the remote device, by a method comprising:
receiving, at the first application executing on the apparatus and from the second application executing on the apparatus, a request requesting for an activation response, wherein the first application different than the second application;
requesting, by the first application, the activation response from the remote device;
receiving, by the first application, the activation response from the remote device for provision to the second application;
in response to receiving the activation response from the remote device, providing, by the first application and to the second application, the activation response comprising activation data, the activation response having been generated on a basis of data associated with the remote device; and
in response to the first application providing the activation data, requesting, by the second application executing on the apparatus and to the remote device, activation of the second application, wherein the activation of the second application includes the remote device activating the second application using the activation data, and the remote device is different than the apparatus.

* * * * *

UNITED STATES PATENT AND TRADEMARK OFFICE
CERTIFICATE OF CORRECTION

PATENT NO.            : 9,807,075 B2
APPLICATION NO.       : 14/812756
DATED                 : October 31, 2017
INVENTOR(S)           : Saul Kessler et al.

Page 1 of 1

It is certified that error appears in the above-identified patent and that said Letters Patent is hereby corrected as shown below:

In the Claims

Column 12, Lines 41-42, Claim 7, delete "that that" and insert -- that --;

Column 14, Lines 11-12, Claim 17, delete "that that" and insert -- that --.

Signed and Sealed this
Fifth Day of May, 2020

Andrei Iancu
*Director of the United States Patent and Trademark Office*